United States Patent [19]

Bibl et al.

[11] Patent Number: 4,952,950
[45] Date of Patent: Aug. 28, 1990

[54] PAPER TRANSPORT AND PAPER STABILIZING SYSTEM FOR A PRINTER PLOTTER OR THE LIKE

[75] Inventors: Andreas Bibl, Los Altos; John Higginson, Santa Clara; Deane Gardner, Cupertino, all of Calif.

[73] Assignee: Rastergraphics, Inc., Sunnyvale, Calif.

[21] Appl. No.: 322,457

[22] Filed: Mar. 10, 1989

Related U.S. Application Data

[62] Division of Ser. No. 166,716, Mar. 11, 1986, Pat. No. 4,878,071.

[51] Int. Cl.[5] ............................................. G01D 15/00
[52] U.S. Cl. ...................................... 346/157; 346/136
[58] Field of Search ............ 346/157, 136, 150, 153.1; 355/308

[56] References Cited

U.S. PATENT DOCUMENTS 4,023,894  5/1977  Goel ..................................... 346/159
4,768,046  8/1988  Minor et al. ....................... 346/160.1

Primary Examiner—Arthur G. Evans
Attorney, Agent, or Firm—Lyon & Lyon

[57] ABSTRACT

A vacuum transport belt for use in a multipass, multicolor raster printer has a vacuum attach means for providing a strong hold down vacuum force in the direction of paper travel for complete registration of a recording material with respect to a writing head and toner system. The vacuum attach means comprises a thin metal strip bonded to a transport belt such that the surface of the strip is substantially flush with the surface of the belt. A strong hold down vacuum is conducted through channels underneath the bonded strip to a series of closely clustered apertures which form a vacuum contact region on the strip. The force of the vacuum applied at the contact region and the substantially flush contact between the surface of the strip and the transport belt tightly seals the entire surface of the recording material to the transport belt, thereby registering the recording material precisely to the transport belt in an invariant desired alignment with a writing head and toner system.

21 Claims, 4 Drawing Sheets

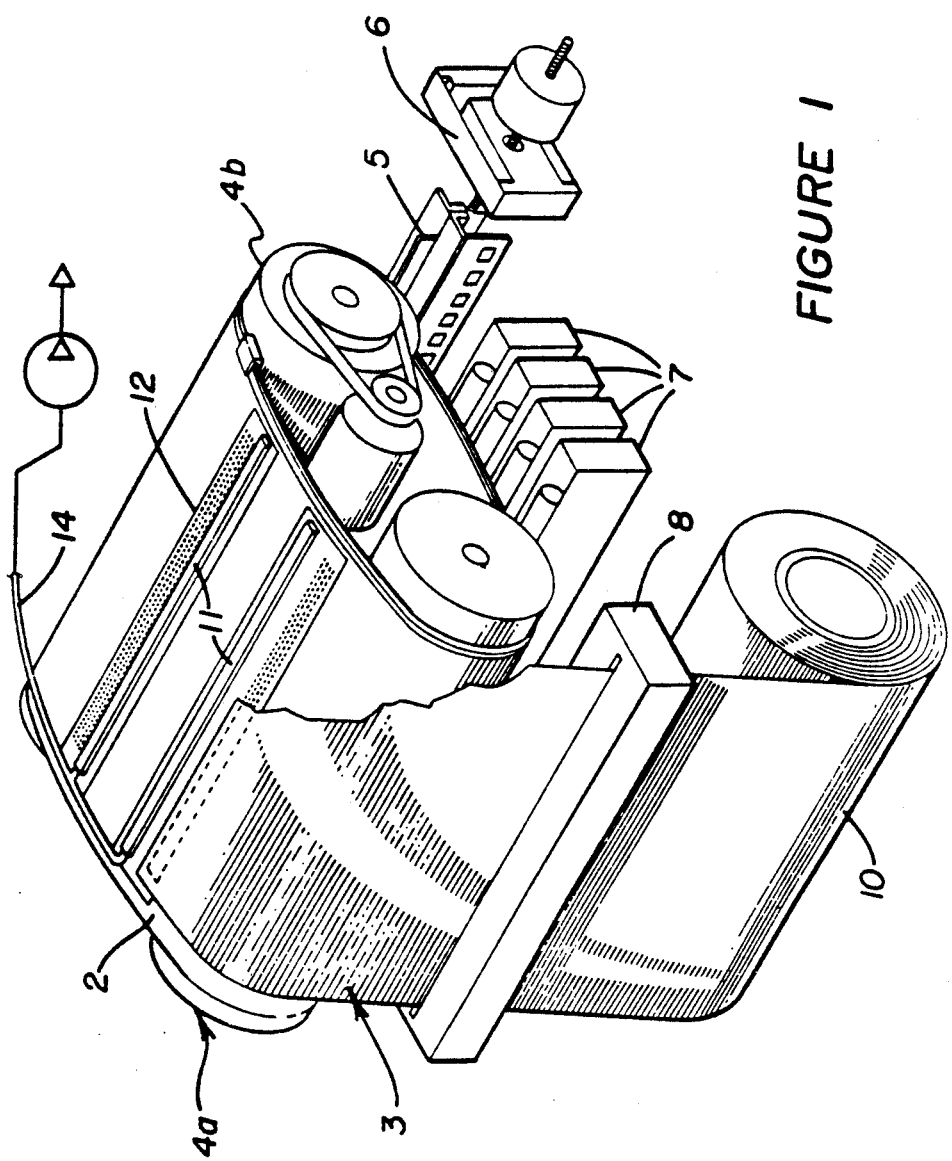

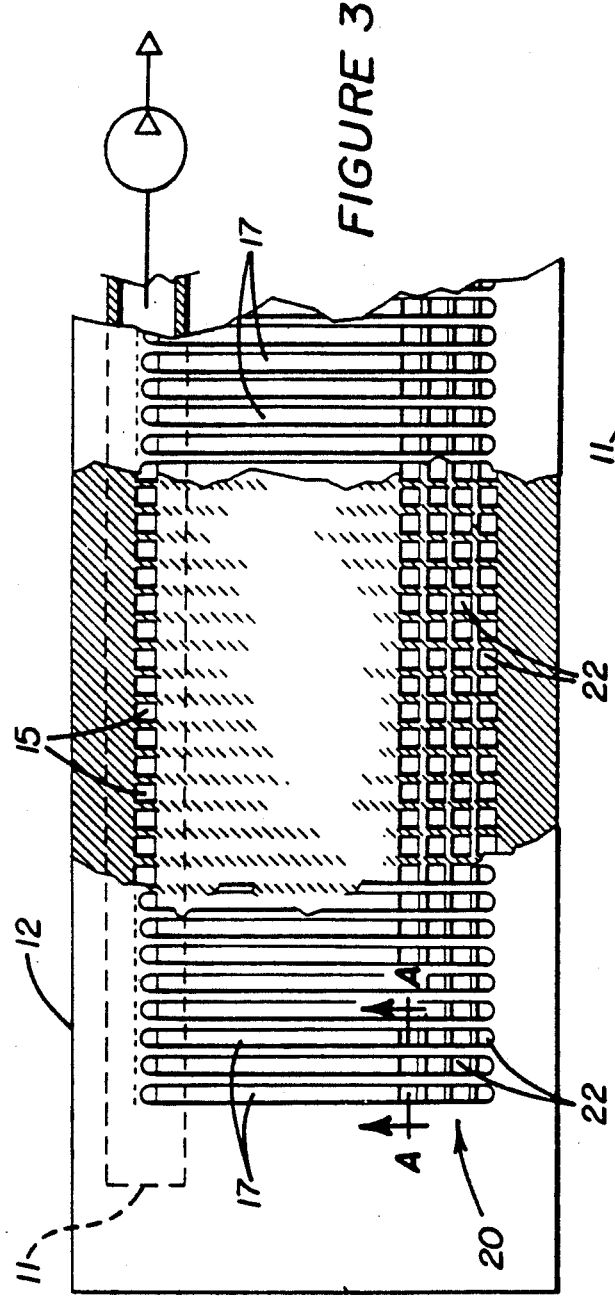
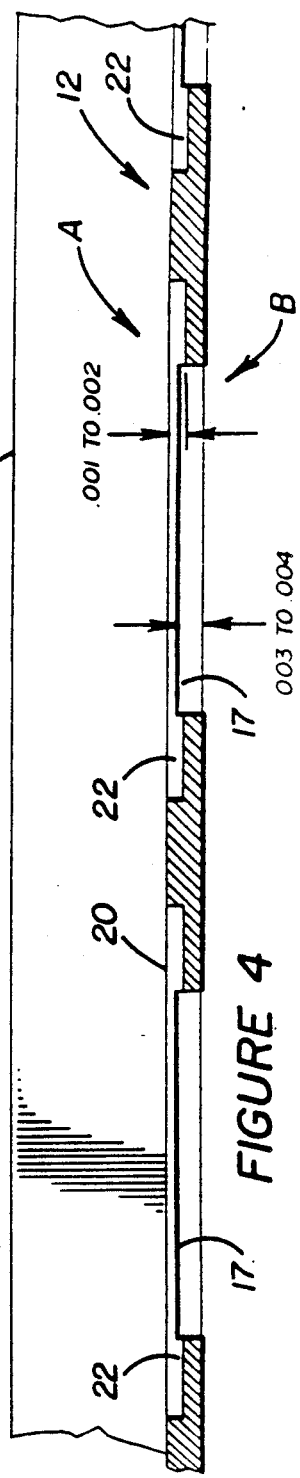

PAPER TRANSPORT AND PAPER STABILIZING SYSTEM FOR A PRINTER PLOTTER OR THE LIKE

This is a division of application Ser. No. 166,716, filed Mar. 11, 1986, now U.S. Pat. No. 4,878,071.

BACKGROUND OF THE INVENTION

This invention relates to a vacuum transport belt for providing improved registration of paper in a multipass, color raster line printer and the like. The vacuum transport belt according to the present invention registers the paper firmly and accurately with a previously unattainable degree of invariance with respect to a writing head and a series of toning heads, while at the same time moving the paper relative to the stationary writing and toning heads.

The typical prior art color electrostatic plotters, which are of multipass nature, rely on a novel but unreliable system to achieve adequate color to color registration. This system consists of writing tick marks during the first black pass along both edges of the paper. During subsequent passes an optical system reads these marks and feeds back any dimensional or position changes in the paper to the writing control system and paper tracking system. This method works well for correcting the typical positional movement of the paper, but it cannot correct for paper growth in the direction parallel to the writing head. The registration marks of prior art systems that are plotted along the edges of the paper are unsightly compromises. Also, prior art web based plotters require significant operator time to precisely align and thread the paper into the plotter every time a new plot is to be generated. The necessity of printing registration marks also has the disadvantage of generating wasted paper every time a new plot is completed.

The advent of the single pass web electrostatic plotter was an attempt to solve the registration problem and increase plotting speed. However, this method has the disadvantage of placing very tight constraints on the toning system. In order to take advantage of the high potential output speed, very little time is allowed for the toners to dry adequately. The single pass system also typically requires four expensive writing heads and four vector to raster controllers instead of the single head and single controller required by the multipass system. Registration can still be a problem, unless the four writing heads are very precisely lined up relative to each other and the paper does not move significantly during the printing process.

A more recent attempt at solving the paper stabilizing problem was partially successful with the advent of a color electrostatic plotter employing a rotating drum and helically scanning head and toning system. The salient advantage of the helical scanning drum system is that cut sheet paper is loaded on the drum automatically and held down by vacuum, while a small writing head and toning shoe helically write the image on paper. This system has a disadvantage of a relatively small writing head and toning system which must be very precisely and compliantly mounted to the traveling carriage. Further disadvantages to helical scan plotting are overwhelming. For example, the adjacent band to band writing and toning "edge effects" are very difficult, if not impossible, to overcome. The rigid drum acting as a backing surface creates a very harsh environment for the dielectric paper. Excessively high head pressures are required to achieve adequate writing quality, thereby resulting in damage to the dielectric coating of the paper.

In view of the foregoing disadvantages of prior art devices, it is apparent that what is needed is a paper transport system for an electrostatic plotter or multipass color raster line printer which enables precise and invariant registration of paper against a writing head and series of toning heads while the paper is moved back and forth over the writing and toning assembly. Precise registration of the paper is necessary in order to obtain proper resolution and an improved degree of color to color registration. It is known that superior and consistent color rendition from a raster type plotter requires a pass to pass registration of better than one half the dot spacing. At typically 400 dots per inch, the accuracy required is 30 micrometers. Since dielectric paper (or any unsealed paper) grows and shrinks with very small changes of humidity during a plotting cycle, it is obvious that it is very important to keep the paper stabilized during subsequent plotting passes. Another very important requirement of the electrostatic plotting process is that the head to paper interface must be very intimate ($\pm 1$ micrometer) across the whole width of the paper, without applying excessive pressure.

SUMMARY OF THE INVENTION

In order to overcome the foregoing disadvantages of known paper transport systems for multi-pass color raster line printers and plotters, the present invention provides a paper transport and registration system which satisfies the conflicting objectives of stabilizing the paper during the different plotting passes and providing a flexible, compliant interface between the writing head and paper. Another very important benefit of the present invention is that the effective plotting resolution may be doubled without doubling the number of high voltage drivers and the number of nibs on the writing head. This advantage has potentially an enormous favorable economic consequence, as explained infra.

The apparatus according to the present invention includes a flexible but stable, continuous belt which is stretched by two main rollers. This belt has a vacuum attach area disposed across its full width for engageably contacting a leading and trailing edge of paper or other recording material disposed thereon. A unique feature of this vacuum attach area is the strong hold down force in the direction of paper travel provided by the vacuum. The force of the vacuum is of such an unexpected magnitude that vacuum also leaks under the paper along the length of the belt, thereby keeping the entire surface of the paper in very intimate contact with the belt during the plotting cycle. The total circumference of the belt is slightly larger than the sheet of paper the system is designed to hold. An automatic feed and cutter system supplies the paper from a supply roll to the leading edge vacuum attach region, which then seizes the paper and stretches the paper onto the belt. When a desired amount of paper has been metered out, the paper is cut and attached by vacuum onto the trailing edge. Once the paper has been stretched onto the belt it is completely stabilized. Extraordinary stability results from the fact that the front or top surface of the dielectric paper forms basically a hermetic seal, and the backside of the paper is sealed by the belt. This enables all air to be drawn out from the contact region between the surface of the belt and the paper. Thus, the paper can now be precisely registered to the vacuum belt and moved back and forth over the writing head and toners without any distortion.

The apparatus according to the present invention provides a significant advantage over the prior art in that it enables the writing nibs of a multipass color raster line printer to be tracked precisely to preceding passes at one-half the distance between the writing nibs of prior art plotters, thereby achieving a doubling of the density of dots and superior resolution. For example, a first pass of evenly spaced dots is written by a writing head on paper which is completely stabilized using the transport system according to the present invention. Then, the writing head can be shifted horizontally a distance equal to the diameter of one dot. Upon a successive pass of the writing head, another row of dots now can be centered between the dots previously written. The apparatus according to the present invention thereby provides the advantage of achieving superior resolution with a far less complex writing head and a smaller graphics dot memory than an expensive, single pass high resolution plotter.

As will be explained, the present invention enables paper or other similar recording material to be mechanically registered to a very high degree of precision. The paper is held rigidly by the vacuum belt without expansion or contraction due to humidity changes or mechanical deformation, as is so common in web type electrostatic plotters. Writing and toning can be accomplished without the paper going through any distortion during successive passes of a writing head.

BRIEF DESCRIPTION OF THE DRAWINGS

These and other advantages of the present invention may be appreciated from the following detailed description of the preferred embodiment together with the drawings in which:

FIG. 1 is a perspective view of a first embodiment according to the present invention;

FIG. 3 is a view of the underside of the vacuum attach means according to the present invention; and FIG. 4 is a sectional view along section A—A of FIG. 3.

DETAILED DESCRIPTION

Figure 1A:
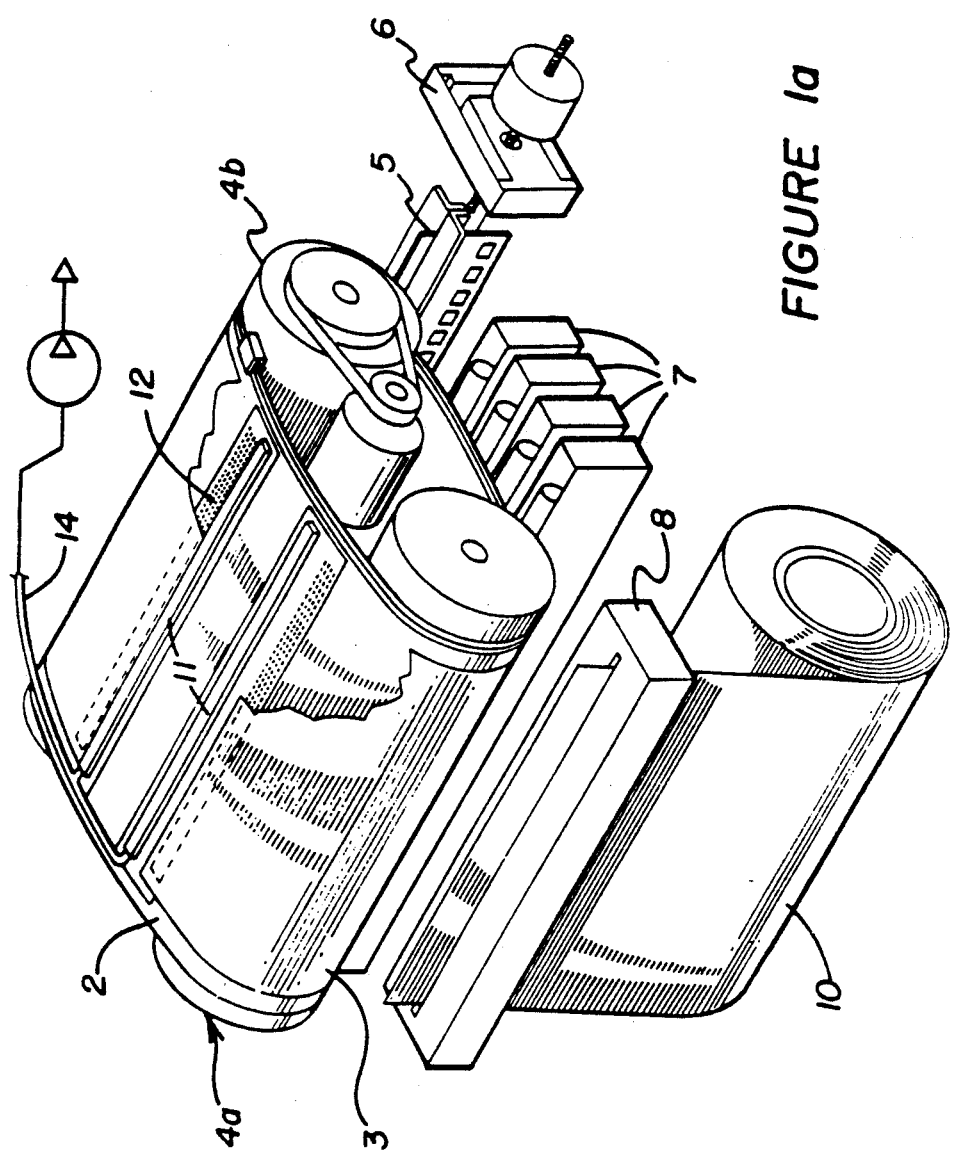
FIG. 1a is a perspective view of the embodiment of FIG. 1 with paper in a fully loaded position.

Referring to FIG. 1, an apparatus according to the present embodiment provides a multipass color raster line plotter or printer 1 employing electrostatic, thermal or other writing technologies. Electrostatic plotter 1 employs a flexible transport means 2 for registration thereon of a recording material 3.

In the preferred embodiment, transport belt means 2 is a continuous, thin, flexible but stable belt consisting of a stainless steel or nickel material having a thickness of approximately 0.002-0.005 inches. Transport belt 2 is provided with a vacuum attach means 12 for stabilizing and for providing registration thereon of recording material 3. In the preferred embodiment, transport belt 2 is suspended and stretched by two rollers 4a and 4b, respectively. Rollers 4a and 4b function as a means for passing the recording material 3 past a writing head 5. The transport belt 2 is slightly larger than the means for recording 3 which will be attached before the writing process begins In the preferred embodiment, the means for recording 3 comprises conventional recording paper. The recording material or paper 3 is attached to the transport belt 2 by the vacuum attach means 12 which initially applies vacuum to the leading and trailing edges of the paper. The effect of the vacuum quickly spreads beyond the leading and trailing edges to thereby evacuate all of the air from between the paper and the transport belt 2 such that the paper becomes perfectly registered to the transport belt. This is achieved with the preferred embodiment by assuring that the recording paper has a plasticized, extremely smooth undersurface which is to be in contact with the top surface of transport belt 2. The smooth surface of the recording material 3 interfacing with the slick metal surface of the belt enhances the rigid adherence and registration of the paper 3 to the belt 2 because the strong vacuum provided by vacuum attach means 12 gradually removes all air from the space between the smooth undersurface of the paper 3 and the top surface of the belt 2.

A full width writing head 5 is supported by an articulating structure represented schematically at 6. Articulating structures are well known in the art. It will be appreciated that many forms of articulating structures could be implemented in the apparatus according to the present invention by a person skilled in the art without undue experimentation. Accordingly, details of the articulating structure are omitted. The articulating structure 6 has a coarse up and down motion to make clearance for a vacuum attach manifold 11. Articulating structure 6 also produces a fine servo motion in the direction orthogonal to belt travel for moving the writing head 5 horizontally on the belt. The writing head 5 is also located in a region, which when engaged against the belt 2, is riding against the most compliant part of the belt 2. Means for applying toner to the recording material 3 also engages the belt. In the preferred embodiment, the means for applying toner comprises a toner assembly 7. Toner is applied by four toning stations, in the toner assembly 7 containing a black, cyan, magenta, and yellow toner fluid. The toner assembly 7 is located adjacent to the writing head 6 and also rides against a complaint part of the belt 2. Each toning station comprising toner assembly 7 has the ability to move up and down for selection as required during the sequential color passes. FIG. 1a shows the paper 3 in a fully loaded position on the belt 2 after having been cut by cutting and feed mechanism 8. The paper 3 is now ready for plotting.

In operation, the belt 2 with the loaded paper 3 begins its first color pass by momentarily coming to a stop with the leading edge of the paper being close to the writing head 5. The belt 2, along with the paper 3, make almost a complete revolution as the writing and toning are in progress. The writing head 5 disengages from the paper before it reaches the approaching trailing edge, and the vacuum belt 2 comes to a complete stop with the toning system close to the trailing edge of the paper 3. The toning system 7 then drops away from the paper. The vacuum belt 2 next makes a complete rewind and the process is repeated with the next color, until all four color passes are completed. The paper 3 is then stripped from the vacuum belt 2 and ejected during the final rewind. A means for feeding a new sheet of paper 3 from supply roll 10 and means for cutting the paper to a desired length are provided by cutting and feed mechanism 8.

Figure 2:
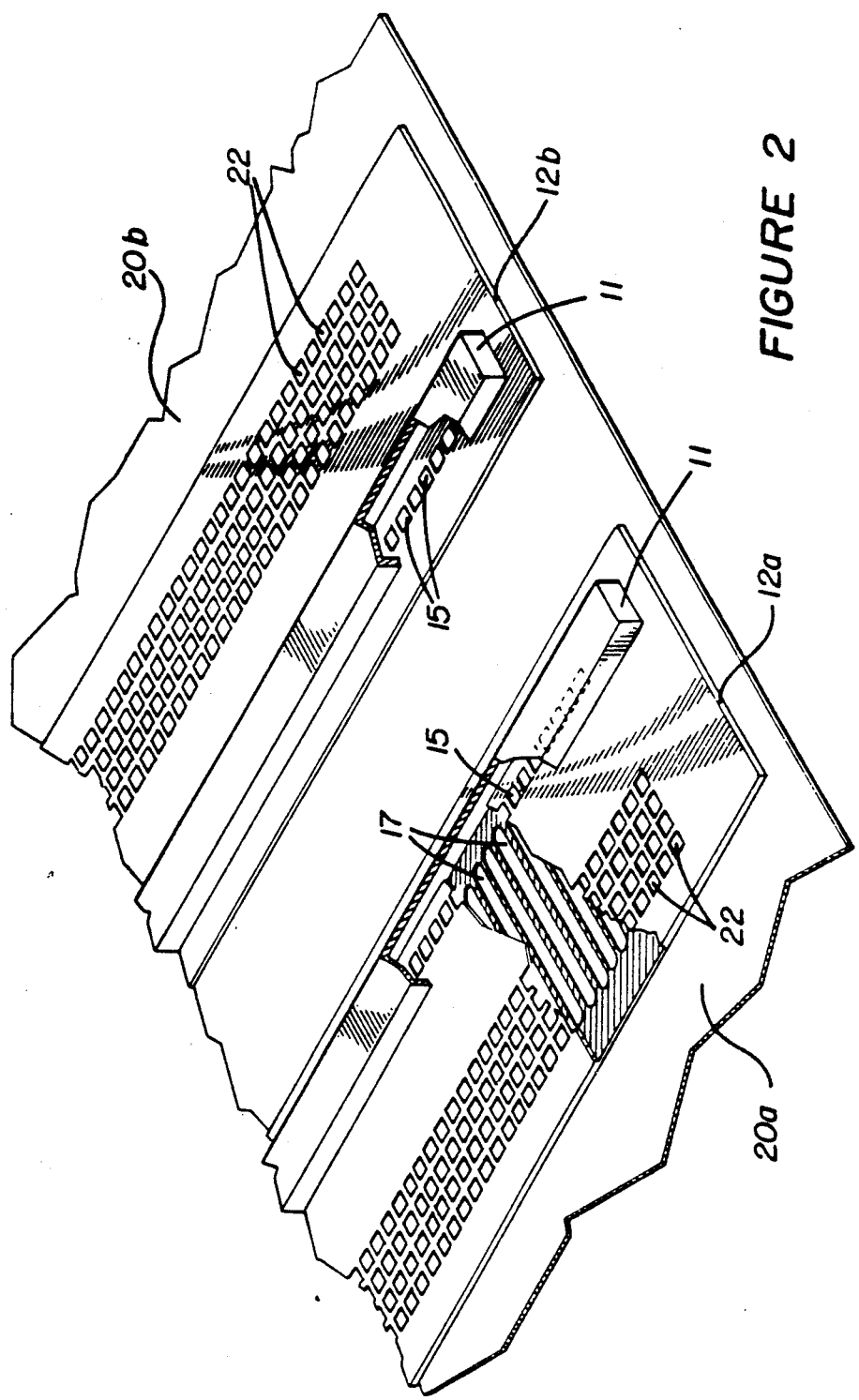
FIG. 2 is a perspective detail view of the vacuum transport belt according to the present invention.

Referring now to FIG. 2, in the preferred embodiment, two vacuum attach means 12a, 12b are fixedly attached or bonded to the surface of vacuum belt 2 by any convenient method. Vacuum attach means 12a, 12b are provided to engage the leading and trailing edges, respectively of a recording material to firmly register the paper to the vacuum belt 2.

Vacuum attach means 12a, 12b comprise in the preferred embodiment a pair of flexible brass strips, approximately 0.005 inches thick which are bonded to form a substantially flush contact with the surface of the vacuum belt 2. Thus, the surface of each vacuum attach means 12a, 12b is virtually integral against the surface of the belt 2. This is important in order to achieve a seal tight relation between the undersurface of the paper 3, the top surface of the belt 2 and vacuum attach regions 20a, 20b of vacuum attach means 12. The substantially integral surface formed by the belt 2 and extremely thin vacuum attach means 12 is essential to prevent the formation of any nonconformities which could trap air and degrade the intensity of the applied vacuum. The strips are disposed across the width of the vacuum belt 2 and form a right angle with the edge of the vacuum belt 2. A vacuum plenum or manifold 11 is disposed on each surface of the vacuum attach means 12a, 12b and extends along the entire length of each the vacuum attach means 12a, 12b. The vacuum plenum 11 has a means for attachment to a vacuum source as shown by the vacuum hose 14 in FIG. 1.

Referring again to FIG. 2, the vacuum plenum provides a vacuum for the attach regions 20a, 20b of the vacuum attach means 12a, 12b which come in contact with and hold down the leading and trailing edges of the paper. The vacuum plenum forms a raised rectangular vacuum chamber which extends along the width of the vacuum belt 2. The outer sides of the vacuum plenum are disposed orthogonally with respect to the direction of travel of the vacuum belt 2. The outer sides of the vacuum plenum 11 are disposed in combination with each vacuum attach regions 20a, 20b to provide a stable means for initial alignment and registration of the leading and trailing edges of the paper to the vacuum belt 2. That is, when beginning the writing operation, the paper can be aligned against the outer sides of the vacuum plenum and thereby registered initially in a proper position with respect to the writing head 5 and toner assembly 7. The application of vacuum to the underside of the leading and trailing edges of paper 3 in contact with vacuum attach regions 20a, 20b then completes the registration of the paper to the belt 2.

Further details of the vacuum attach means are shown in FIGS. 3 and 4. FIG. 3 shows the underside of a vacuum attach means 12. Referring to FIG. 3, vacuum plenum 11 is disposed over a series of vacuum receiving bores 15. Each bore 15 has a connection through an associated channel 17 to a series of primary vacuum applying apertures 22. The channels 17 provide a means for transferring essentially all of the vacuum from the vacuum plenum 11 to the vacuum attach region 20. It will be appreciated that the channels 17 are extremely shallow in order to thereby transfer the vacuum beneath the thin vacuum attach means 12 so as not to interfere with the seal tight relation of the recording material 3 to the substantially integral surface of the vacuum attach means 12 and the belt 2. The primary vacuum apertures 22 are disposed to form the vacuum attach region 20 of the vacuum attach means 12. Primary vacuum apertures 22 provide a means for applying a strong hold down vacuum to the leading and trailing edges of the recording material. In the preferred embodiment, primary vacuum apertures 22 are a series of closely spaced parallel rows of apertures. Each row of apertures is connected with an associated channel 17 through which vacuum is transferred from the vacuum plenum 11. Primary vacuum apertures 22 directly contact the leading and trailing edges of the paper as other recording material disposed on the surface of the belt.

The channels 17 are photolithographically etched in the underside of the vacuum attach means 12 or are otherwise formed by any conventional etching process. When the vacuum attach means 12a, 12b are bonded to the vacuum belt 2, the channels 17 provide sealed vacuum passages in the interior of the vacuum attach means.

It will be appreciated that the vacuum produced in the vacuum plenum 11 is transferred to the primary vacuum applying apertures 22 of the vacuum attach means 12 without any perceptible leakage. The primary vacuum apertures 22 come in sliding contact with the underside of the paper 3 as it is initially registered against the sides of the plenum 11. The vacuum produced by the primary vacuum apertures 22 is particularly strong and is provided in the direction of paper travel. It has been found that this vacuum unexpectedly provides not only a precise, invariant registration of the leading and trailing edges of the paper to the belt, but the vacuum applied by the primary vacuum apertures 20 also travels progressively under substantially the entire surface of the recording material, thereby rigidly adhering an entire sheet of paper 3 to the vacuum belt 2.

It has been found that the spread of vacuum between the lower surface of the recording material 3 and the top surface of the belt 2 is enhanced by the use of a metallic material for the transport belt 2. The slick, smooth surface of a metallic belt as used in the present invention formerly would have been perceived as a detriment to the proper registration of paper in an electrostatic line plotter. It was not deemed practical to stabilize paper on a metal transport belt because the slippery, polished surface of the metal was believed to preclude proper adhesion of the paper to the surface of the metallic belt. However, with the flush, substantially integral surface formed by bonding the thin vacuum attach strips 12a, 12b to a metallic vacuum belt 2 of the present invention, the slick metal surface has been found to enhance the application of vacuum to the paper 3 by eliminating nonconformities which would create air pockets. Accordingly, the vacuum applied by the vacuum attach means 20 actually spreads unimpeded between the slick metal surface of the belt and the overlying paper to form an air tight contact between the paper and the metallic belt. In this regard, superior registration of paper to the belt is achieved when the underside of the paper 3 in contact with the slick surface of the metallic belt is plasticized or otherwise free of porous regions which could allow air flow and reduce the vacuum.

With regard to transportation and stabilization qualities, it has also been found that metal is the preferred material for the vacuum transport belt 2 of the present invention. In a so called web type paper transport system for an electrostatic plotter or the like, the paper or recording material is always subject to a certain amount of pulling and distortion during the writing process. The paper also grows and shrinks in size due to changes in humidity. Additionally, a web transport method of the prior art is subject to some distortion in operation when transporting the paper. All of the foregoing factors degrade the proper registration of the recording material to the transport belt and result in poor resolution and poor color to color registration.

In contrast, the metal belt of the present invention does not distort when pulled and thereby provides a stable base by which the vacuum attach means 12a, 12b of the present invention may achieve precise registration of the paper at all times during the writing scheme. Distortion may be reduced or eliminated because a metal belt is compliant in the vertical or Z axis while maintaining rigidity in the X and Y axes. The registration of paper achieved by the apparatus according to the present invention is extremely important in an electrostatic plotter or printer because of the precise tolerance which must be maintained between the writing head and the paper surface. In a conventional electrostatic plotter, the writing head must be maintained in intimate contact with the paper across its entire width. The clearance between the end of the writing head and the top surface of the paper is typically much less than 1/10000 of an inch.

The compliant nature of the metal belt in the Z axis (vertical direction) and its rigidity in the X and Y axes provides significant advantages over prior art paper transport systems. The property of compliancy enables precise registration of the paper even with changes in alignment between the writing head and the paper surface in contact therewith due to differential thermal expansion and changes in the surface texture of the paper as may be caused by increased humidity. The metal belt of the present invention stabilizes the paper, and does not distort, grow or shrink appreciably with changing temperature and humidity. This enables a more precise registration of paper than was previously possible. The foregoing advantages of the metallic belt used in present invention also enhance color to color registration and resolution.

The apparatus according to the present invention achieves a more constant and precise registration of paper to the paper transport and writing system than was previously possible in a multipass electrostatic plotter. This has the further advantage of enabling the present invention to achieve a doubling of the density of dots which can be produced by an ordinary writing nib in a prior art electrostatic plotter. This enables the present invention to achieve superior resolution which formerly would have been possible only by employing very expensive, high resolution writing heads. The doubling of the density of dots is made possible by reason of the complete registration of paper to the entire surface of the vacuum belt 2 as described above.

The improved resolution of the present invention occurs as follows. The writing head of a multipass electrostatic plotter makes a first pass over the paper and produces a first set of dots from the writing nibs (not shown). On a second pass over the paper, the present invention enables the writing head to be moved one half of the distance between the writing nibs. This achieves a doubling of the dots because the writing nibs print a second set of dots which are precisely tracked to the first set and are spaced at only one half of the ordinary distance. For example, on a second pass, the writing nibs may be tracked with such precision as to place another row of dots between the dots already written on the first pass.

A conventional writing head typically prints 200 dots per inch. It is known that paper will grow and shrink a maximum of 4 dots laterally without being stabilized by a metallic vacuum belt according to the present invention. As a result, previous devices could not track a writing head to a previous pass at the present distance of only one half of the distance between the writing nibs. The present invention thereby achieves superior resolution with inexpensive writing heads by enabling a standard writing head to make successive passes over the paper which are spaced only a very small distance apart. Note that in prior art devices, such enhanced resolution could be achieved only by the use of very expensive writing heads having double the number of nibs. Thus, the present invention is able to achieve the same enhanced resolution and image clarity which formerly could be obtained by an expensive, high resolution writing head.

The apparatus according to the present invention also enables double resolution color plotting to be achieved simply and without the expense of a more complicated writing head, due to the high degree of paper stability guaranteed by the vacuum belt 2 of the present invention. Prior to each color and writing-toning pass, a writing-only pass is made with the head shifted laterally by one half dot. The subsequent writing and toning pass is done with the writing head and toning system in normal position. The writing head and raster image memory complexity are cut in half with this method, compared with conventional techniques.

Referring now to FIG. 4, a method for manufacturing the vacuum attach means 12 of the present invention is explained as follows. A thin, flexible strip of material 12 is etched from both sides employing standard lithographic techniques. In the preferred embodiment, the vacuum attachment means 12 is comprised of a brass strip approximately 0.005 inches thick. The paper contacting top surface A of the brass strip is etched to a depth of 0.001 to 0.002 inches. The etching produces a single row of apertures and, spaced apart from the single row, multiple rows of apertures disposed in parallel. The single row of apertures forms the vacuum receiving bores 15 which are overlain by the vacuum plenum or manifold 11 as shown in FIGS. 2 and 3. The multiple rows of apertures comprise the vacuum attach region 20 consisting of primary vacuum holes 22 which provide the vacuum hold down force for registration of the entire surface of the paper to the belt 2.

The underside of the thin brass strip forming the vacuum attach means 12 is etched to a depth of 0.003 to 0.004 inches. This etching produces a series of channels disposed in parallel along the entire length of the strip. Each channel connects a vacuum bore 15 with the series of parallel primary vacuum applying apertures 22 as shown in FIG. 3. The precise arrangement of the channels is not important. When the underside of the strip is bonded to the metal vacuum belt 2, the channels etched therein provide a series of air tight chambers for transferring the vacuum from the vacuum plenum 11 to the primary vacuum applying apertures 20. Thus, the vacuum can be transferred from a vacuum source to the underside of the recording material without any appreciable leakage whatsoever. This produces an extraordinarily strong vacuum holddown effect in the area of the vacuum attach regions 20a, 20b which progressively spreads under the entire surface of the paper to thereby immovably register the paper to the vacuum transport belt 2.

Several alternate paper-to-belt attach schemes are possible. One is to significantly increase the vacuum hold down force over the whole area of the paper, not just under the leading and trailing edge. This can be achieved by incorporating micro groves that are about 1 to 25 microns deep and 50 to 200 microns wide over the whole area of the belt 2 under the active paper area. In this embodiment, the pattern of grooves on the belt also must be configured such that a vacuum applied to the grooves produces a coefficient of friction close to unity between the belt and the paper.

Another possible paper attach scheme is to construct the leading or trailing edge attach area of the transport belt in a way not requiring a vacuum system. This could be done by incorporating a mechanical attach mechanism which clamps the leading and trailing edges of the paper securely in the direction of travel. Even though this is not thought to be as stable as the present vacuum attach system, it can certainly be used in a lesser product.

While the invention has been described in connection with what is presently considered to be the most practical and preferred embodiments, it is to be understood that the invention is not limited to the disclosed embodiment but, on the contrary, is intended to cover various modification and equivalent arrangements included within the spirit and scope of the appended claims.

What is claimed is:

1. An improved, high resolution plotter, printer or the like incorporating a transport belt means for invariant registration of a recording material with respect to a writing head comprising:
   a recording material;
   writing means disposed for printing information on said recording material;
   toning assembly means operatively connected with said writing means enabling said writing means to selectively apply color fluid to said recording material;
   transport means including a belt having an attach means for providing a vacuum to the entire surface of said recording material adjacent said belt such that said recording material is registered in invariant alignment with respect to said writing means and said toning assembly means;
   drive means for passing said transport means past said writing means and said toning assembly means.

2. An apparatus as in claim 1 wherein said transport means includes a vacuum attach means having a surface flush with the surface of said belt for applying a strong vacuum hold down force in the direction of travel of said transport means to said adjacent surface of said recording material disposed thereon, thereby providing invariant registration of said recording material with respect to said writing head means and said toning assembly means.

3. An apparatus as in claim 2 wherein said vacuum attach means for applying a vacuum hold down force to said surface of said recording material comprises:
   an elongate, thin strip disposed substantially across the width of said belt having a paper holding surface for engaging a leading and trailing edge of said recording material thereon;
   a vacuum manifold means having a connection with a vacuum source and mounted on said paper holding surface of said strip for providing a vacuum thereto;
   a series of vacuum receiving apertures extending through said strip for receiving said vacuum provided by said vacuum manifold means;
   a series of vacuum applying apertures spaced apart from said vacuum receiving apertures and thereby forming a vacuum contact region for engaging said recording material;
   means for transferring vacuum from said vacuum manifold means to said vacuum contact region.

4. An apparatus according to claim 3 wherein said means for transferring vacuum comprises a series of parallel channels connecting said vacuum receiving apertures with said series of vacuum applying apertures forming said vacuum contact region, said parallel channels being provided in an opposed surface of said strip contacting said transport belt such that when said strip is bonded to said transport belt, said channels form fully enclosed passages for evenly transferring vacuum from said vacuum manifold means to said vacuum contact region.

5. An apparatus as in claim 2 wherein said belt is comprised of a flexible material which is compliant in the axis orthogonal to paper travel and rigid in the direction of paper travel to thereby stabilize said recording material disposed thereon from dimensional changes due to humidity and thermal expansion.

6. An apparatus as in claim 5 wherein said belt consists of a flexible metal material.

7. An apparatus as in claim 5 wherein said belt consists of a flexible material having a metallic paper holding surface.

8. An apparatus according to claim 6 wherein said belt is provided with a smooth surface for conformably contacting the entire surface of said recording material disposed thereon to thereby facilitate a progressive increase in the coefficient of friction between the surface of said recording material and said belt.

9. A vacuum hold down means for precise registration of a recording material with respect to a writing head and toner assembly in a plotter, printer or the like comprising:
   a transport belt having a paper holding surface for forming a mating configuration and providing an airtight seal with a recording material disposed thereon;
   vacuum attach means disposed on said paper holding surface of said transport belt for providing a strong vacuum hold down force to the leading and trailing edges of said recording material in the direction of paper travel.

10. An apparatus as in claim 9 wherein said transport belt is composed of a material characterized by compliance in an axis orthogonal to paper travel and by rigidity in the direction of paper travel.

11. An apparatus as in claim 9 wherein said vacuum attach means comprises an extremely thin elongate strip having a surface bonded to said transport belt and an opposed surface disposed in substantially integral contact with said paper holding surface of said transport belt to thereby form an airtight seal between said transport belt and said recording material disposed thereon.

12. An apparatus as in claim 11 wherein said elongate strip further comprises:
   a first series of apertures extending therethrough for receiving an applied vacuum from a vacuum source; and
   a second series of closely clustered apertures extending therethrough for providing a vacuum contact region for contacting and registering a leading and trailing edge of said recording material disposed thereon; and transfer means disposed in said surface of said strip bonded to said transport belt for transferring vacuum from said first series of apertures to said second series of apertures.

13. An apparatus as in claim 12 wherein said transfer means further comprises multiple channels provided in said surface of said strip bonded to said transport belt for connecting said first series of vacuum receiving apertures with said second series of closely clustered apertures to thereby provide a vacuum to said vacuum contact region.

14. An apparatus as in claim 9 wherein means for providing a vacuum has a connection with a vacuum source and is disposed on said opposed surface of said vacuum strip for applying a vacuum to said first and second series of vacuum receiving apertures.

15. A method for fabricating a vacuum attach means for registration of a recording material on a transport belt with respect to a writing head in a plotter, printer or the like comprising the steps of:

etching a first series of vacuum receiving apertures in a paper holding surface of a thin metallic strip along the length thereof;

etching a second series of closely spaced vacuum attachment apertures in said paper holding surface of said strip along the length thereof, and spaced apart from said first series of apertures by an intervening area, to thereby form a vacuum contact region on said paper holding surface of said strip for conformably adhering a recording material thereto;

etching a series of channels in an opposed surface of said strip to a depth sufficient to contact said first and second series of apertures, while not penetrating though said intervening area of said paper holding surface separating said first and second series of apertures, and thereby connecting by means of each channel said first series of apertures with said second series of apertures;

bonding said opposed surface of said strip containing said channels to the surface of said transport belt to thereby fully enclose said channels and from tightly sealed vacuum chambers disposed beneath said paper holding surface of said strip for transferring vacuum from said first series of apertures to said second series of apertures.

16. A method as recited in claim 15 further comprising the step of:

providing a vacuum plenum extending along the paper holding surface of said strip in tightly sealed contact with said first series of vacuum receiving apertures for providing a vacuum thereto.

17. An improved, high resolution plotter, printer or the like incorporating a continuous transport belt means for maintaining a recording material disposed thereon in invariant registration with respect to a writing head comprising:

a recording material;

a writing means disposed for printing information on said record material;

a flexible transport belt means characterized by a metallic or extremely smooth paper holding surface for supporting and maintaining said recording material in invariant registration thereon with respect to said writing means, said transport belt means having compliancy in an axis orthogonal to the direction of paper travel and rigidity in the direction of paper travel;

roler means for passing said continuous transport belt and said recording material in a substantially complete revolution past said writing means;

attach means for progressively removing substantially all of the air between said paper holding surface of said transport belt and said record material disposed thereon such that an airtight seal is provided between said paper holding surface of said transport belt and said record material and said record material is thereby maintained in invariant alignment with respect to said writing means.

18. An improved paper stabilizing system for a plotter printer, of the like having a continuous transport belt for supporting a recording medium with invariant registration for one or more revolutions past a writing head comprising:

a writing head means disposed for imprinting information upon a recording medium;

a continuous transport belt means having a uniform, extremely smooth paper holding surface for eliminating air trapping unconformities and for stabilizing said recording medium thereon for one or more revolutions past a writing head;

means for forming an airtight seal between said smooth supporting surface of said belt and said recording medium and for eneabling a vacuum to spread between said paper holding surface of said belt and said entire surface of said recording medium to invariantly stabilize said recording medium with respect to said writing head means.

19. An apparatus according to claim 18 wherein said means for forming an airtight seal includers an extremely thin vacuum attach means disposed flush with said paper holding surface of said belt for providing a vacuum which spreads beneath the entire surface of said recording medium supported on said belt to thereby hold said recording medium on said belt with an invariant degree of stability.

20. In a plotter, printer, or the like, an improved continuous transport belt means for immovably stabilizing a recording medium such as paper for one or more revolutions past a writing head comprising:

a continuous transport belt means having an extremely slick, uniform paper holding surface for supporting said recording medium thereon;

means for providing an airtight interface between said slick surface of said belt and said adjacent recording medium supported thereon such that all air is removed from between said belt and said recording medium and said recording medium is thereby immovably adhered to said slick surface of said belt.

21. An apparatus according to claim 20 wherein said means for providing an airtight interface include attach means for attaching a leading and trailing edge of said recording medium to said belt and means for pressing the remaining portion of said recording medium to said belt to progressively remove all air from between said recording medium and said belt.

* * * * *